United States Patent
Shadravan (12) United States Patent (10) Patent No.: US 10,183,526 B1
(45) Date of Patent: Jan. 22, 2019

(54) VEHICLE WHEEL HAVING A DECORATIVE MEMBER ATTACHED TO A BASE WHEEL AND METHOD OF MANUFACTURE

(71) Applicant: Ali Reza Shadravan, Miami, FL (US)

(72) Inventor: Ali Reza Shadravan, Miami, FL (US)

(73) Assignee: AMERICAN FORCE WHEELS, INC., Hialeah, FL (US)

( * ) Notice: Subject to any disclaimer, the term of this patent is extended or adjusted under 35 U.S.C. 154(b) by 0 days.

(21) Appl. No.: 15/353,929

(22) Filed: Nov. 17, 2016

(51) Int. Cl.
| | |
|---|---|
| *B60B 7/14* | (2006.01) |
| *B62D 65/12* | (2006.01) |
| *B60B 7/02* | (2006.01) |
| *B60B 7/18* | (2006.01) |
| *B23C 3/00* | (2006.01) |

(52) U.S. Cl.
CPC .............. *B60B 7/14* (2013.01); *B23C 3/00* (2013.01); *B60B 7/02* (2013.01); *B60B 7/18* (2013.01); *B62D 65/12* (2013.01); *B23C 2215/085* (2013.01); *B60B 2310/228* (2013.01); *B60B 2310/232* (2013.01); *B60B 2320/16* (2013.01); *B60B 2900/572* (2013.01)

(58) Field of Classification Search
CPC .... B60B 7/14; B60B 7/18; B60B 7/02; B60B 2900/572; B60B 2320/16; B60B 2310/228; B23C 3/00; B23C 2215/085; B62D 65/12

USPC .............. 301/37.101, 37.102, 37.34, 37.371, 301/37.106, 37.42, 37.26, 37.28, 37.108, 301/37.109

See application file for complete search history.

(56) References Cited

U.S. PATENT DOCUMENTS

| | | | | |
|---|---|---|---|---|
| 7,097,730 | B2 * | 8/2006 | Woelfel | B29C 44/1233 156/290 |
| 7,669,940 | B2 * | 3/2010 | Diko | B60B 7/14 301/37.106 |
| 2004/0075335 | A1 * | 4/2004 | Hartl | B60B 7/04 301/108.1 |
| 2007/0182240 | A1 * | 8/2007 | Zanin | B60B 7/14 301/37.373 |
| 2015/0042149 | A1 * | 2/2015 | Wang | B60B 7/066 301/37.102 |

* cited by examiner

*Primary Examiner* — S. Joseph Morano
*Assistant Examiner* — Jean W Charleston
(74) *Attorney, Agent, or Firm* — Daniel S. Polley, P.A.

(57) ABSTRACT

A method for manufacturing and attaching a novel vehicle wheel generally comprising a decorative member that is attached to a base wheel. In one non-limiting embodiment, a plurality of mounting apertures are provided on the base wheel that is secured to the vehicle axis/hub. The decorative member is provided with corresponding apertures that are aligned with the mounting holes of the base wheel. Bolt member, preferably hexagonal bolts are then inserted/ threaded through the aligned apertures for securing the decorative member to the base wheel. A novel manufacturing method is also disclosed for manufacturing the base wheel and decorative attachment.

15 Claims, 11 Drawing Sheets

VEHICLE WHEEL HAVING A DECORATIVE MEMBER ATTACHED TO A BASE WHEEL AND METHOD OF MANUFACTURE

1. FIELD OF THE INVENTION

The invention relates generally to wheels for motor vehicles.

2. BACKGROUND

Having decorative motor vehicle wheels has become more popular with consumers for the vehicles. The below disclosure is directed to a novel vehicle wheel generally comprising a decorative member attached to a base wheel for enhancing the decorative appearance of the motor vehicle at the wheel area.

SUMMARY OF THE DISCLOSURE

Disclosed is a method for manufacturing and attaching a novel vehicle wheel generally comprising a decorative member that is attached to a base wheel. The base wheel can be conventionally attached to an axle/hub of a vehicle similar to how conventional wheels are secured. Similarly, the tire can be secured to the base wheel similar to how a vehicle tire is conventionally secured to a conventional wheel.

In one non-limiting embodiment, a plurality of mounting apertures are provided on the base wheel that is mounted to the vehicle, that are separate from the lug holes/apertures used for mounting the base wheel to the vehicle axis. The decorative member is provided with corresponding apertures that are aligned with these separate mounting apertures of the base wheel. Bolt members, preferably hexagonal bolts are then inserted/threaded through the aligned apertures for mounting the decorative member to the base wheel. A novel manufacturing method is also disclosed for manufacturing the base wheel and decorative attachment.

BRIEF DESCRIPTION OF THE DRAWINGS

FIG. 9b is a perspective view of the vehicle wheel shown in FIG. 9a.

DETAILED DESCRIPTION

Figure 1:
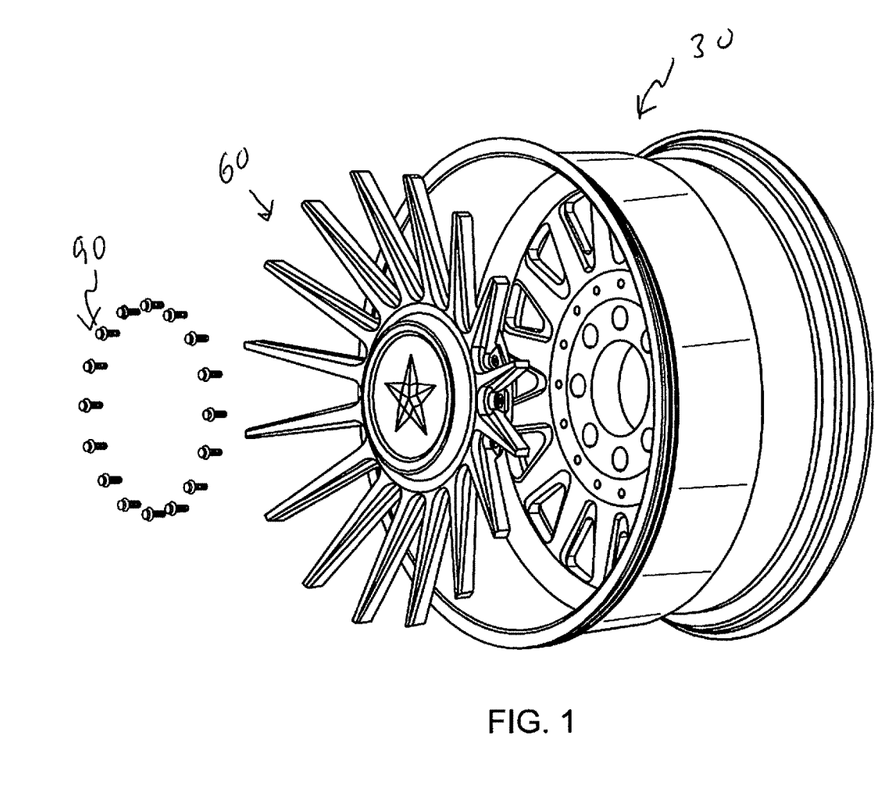
FIG. 1 is an exploded perspective view of the novel vehicle base wheel and decorative member in accordance with one non-limiting embodiment of the present disclosure.

A novel vehicle wheel comprising a decorative member that is attached to a base wheel is disclosed and includes a manufacturing method for the decorative member and vehicle base wheel. FIG. 1 illustrates generally the main components, which comprise a base wheel 30, a center decorative member 60 and a plurality of bolt members 90 for attaching the center decorative member to the base wheel. The decorative design shown for the base wheel and the center decorative member is not considered limiting and many other designs for the decorative member and/or base wheel can be used and all of which are considered within the scope of the disclosure. Though, not considered limiting, preferably the mounting bolts can be hexagonal bolts (e.g. M8 hexagonal bolts, etc.)

Figures 2, 2A:
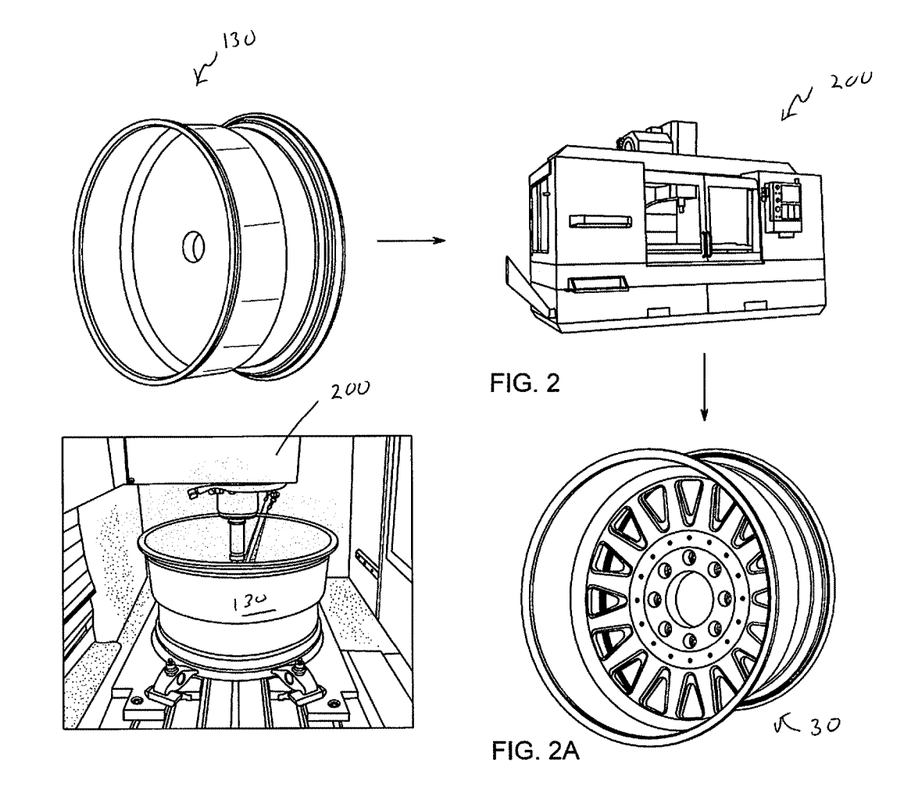
FIG. 2 is a process flow diagram for one non-limiting embodiment for manufacturing a motor vehicle base wheel in accordance with the present disclosure.
FIG. 2a is a perspective view of a CNC milling machine shown during the manufacture of the motor vehicle base wheel in accordance with the present disclosure.

FIG. 2 illustrates the process flow, in one non-limiting embodiment, for manufacturing the base wheel. Initially, a blank wheel 130 is provided. In one non-limiting embodiment, the blank wheel can be a blank 6061 aluminum super-single truck wheel forging. Other blank wheels (e.g. trucks, cars, etc.) can also be used and all are considered within the scope of the disclosure. The blank wheel can be positioned within a CNC milling machine 200, which is used to create the specific decorative and functional design for base wheel. FIG. 2a shows the CNC milling machine creating the design in the blank wheel 130. Preferably, the CNC milling machine can be programmed with all needed information for machining the blank into the specific base wheel design. When finished, the base wheel 30 is provided with all lug holes/apertures needed for mounting the base wheel to the vehicle axle/hub, as well as all holes needed for attaching the decorative member to the base wheel. In one non-limiting embodiment, the CNC milling machine can be a 3-axis CNC milling machine. Other machines that allow a specific design to be machined from a blank wheel 130 can also be used and are considered within the scope of the disclosure.

Figure 3:
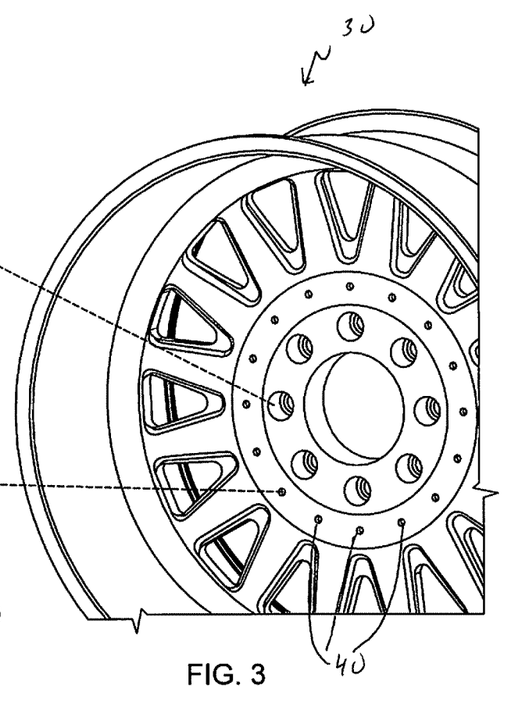
FIG. 3 is a perspective view of vehicle base wheel in accordance with the present disclosure.
Figure 3A:
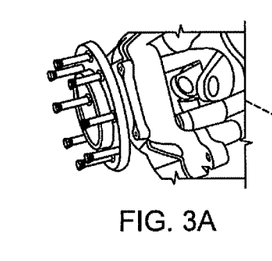
FIG. 3a is a perspective view of a vehicle specific pitch circle diameter ("PCD") and hub bore for the vehicle base wheel of FIG. 3.
Figure 3B:
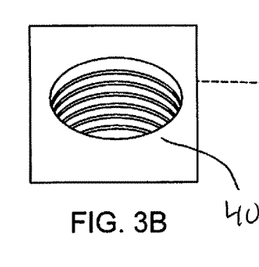
FIG. 3b is a perspective view of a threaded hole for the vehicle base wheel of FIG. 3.

As seen in FIG. 3, FIG. 3a and FIG. 3b, the base wheel 30 preferably receives all machining necessary to mount the base wheel to the vehicle and to mount the center decorative member 60 to the base wheel 30. FIG. 3a specifically shows the vehicle specific PCD and hub bore and FIG. 3b shows a receiving channel with a threaded hole 40, such as but not limited to, a M8 threaded hole, which is one of the holes that is sued for attached the center decorative member 60 to the base wheel 30. The base wheel can be preferably mounted to the vehicle as conventionally known. Similarly, the vehicle tire is secured to the base wheel 30 as conventionally known. The vehicle specific PCD can be the pattern of lug holes for the base wheel that allow the wheel to be fixed to the hub via the lugs/lug nuts. Reference to the hub bore can also be described as the centerbore and is referring to the hole in the center of the base wheel 30 that first around the vehicle hub.

Figure 4:
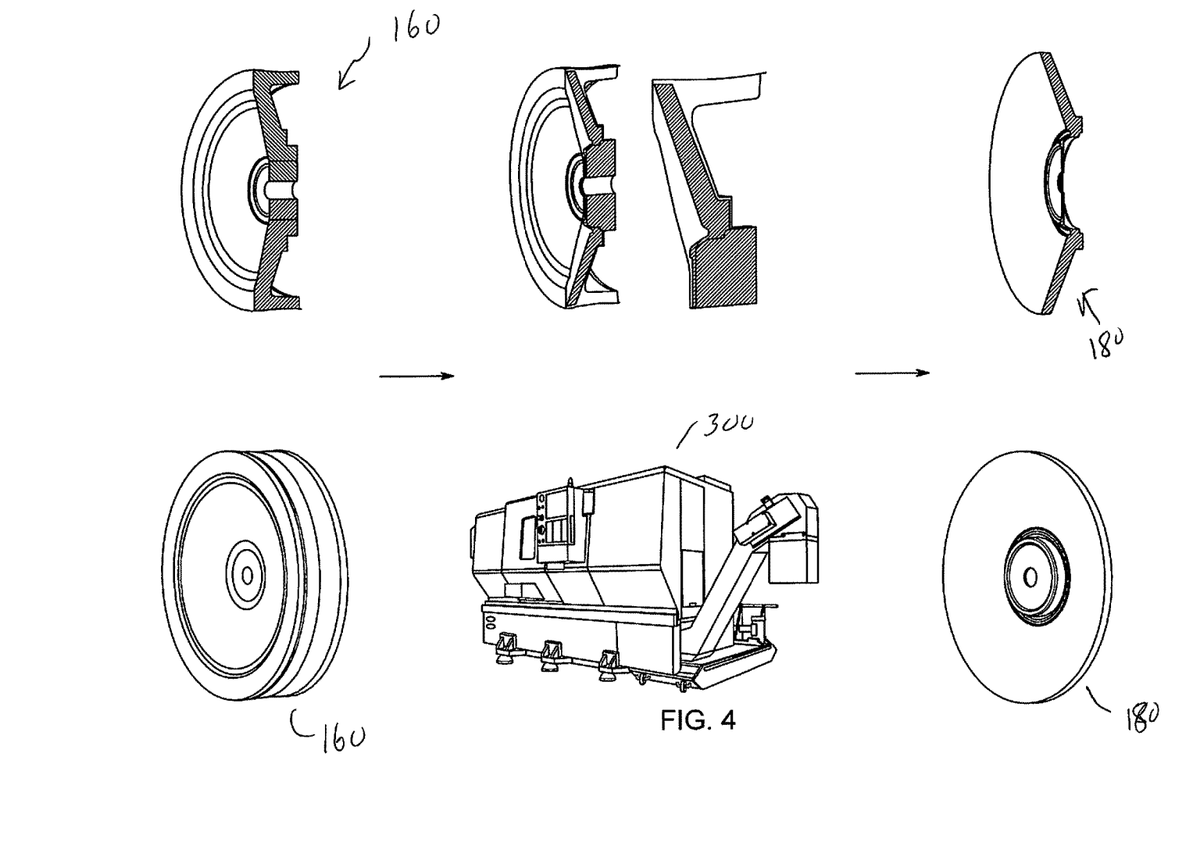
FIG. 4 is a process flow diagram for one non-limiting embodiment for manufacturing a blank center from a blank concave wheel in accordance with the present disclosure.

FIG. 4 illustrates a non-limiting process flow embodiment for manufacturing a blank center 160 from a blank concave wheel in accordance with the present disclosure. Initially, a blank concave wheel forging is provided. Next a CNC lathe machine 300 can be used to machine (turn) a profile 180 out of the blank forging. The CNC lathe can be programmed with the desired profile. The resultant piece from the machining by the CNC lathe is shown and will be used for creating the decorative center member, which steps are described below in the description for FIG. 5. FIG. 4 also illustrates sectional view of the blank concave wheel forging and the resultant piece/center.

Figure 5:
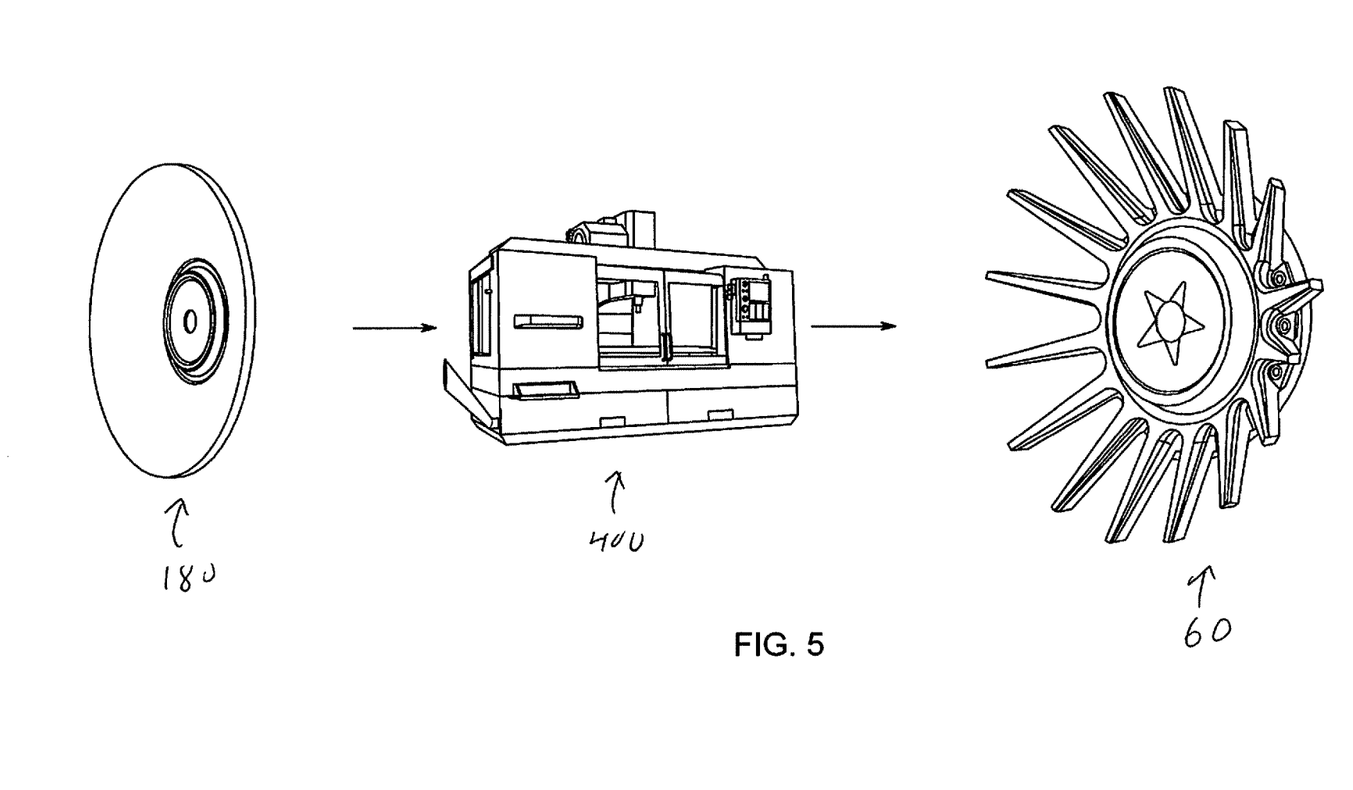
FIG. 5 is a process flow diagram for one non-limiting embodiment for manufacturing the decorative member from the blank center preferably manufactured by the process of FIG. 4.
Figure 6:
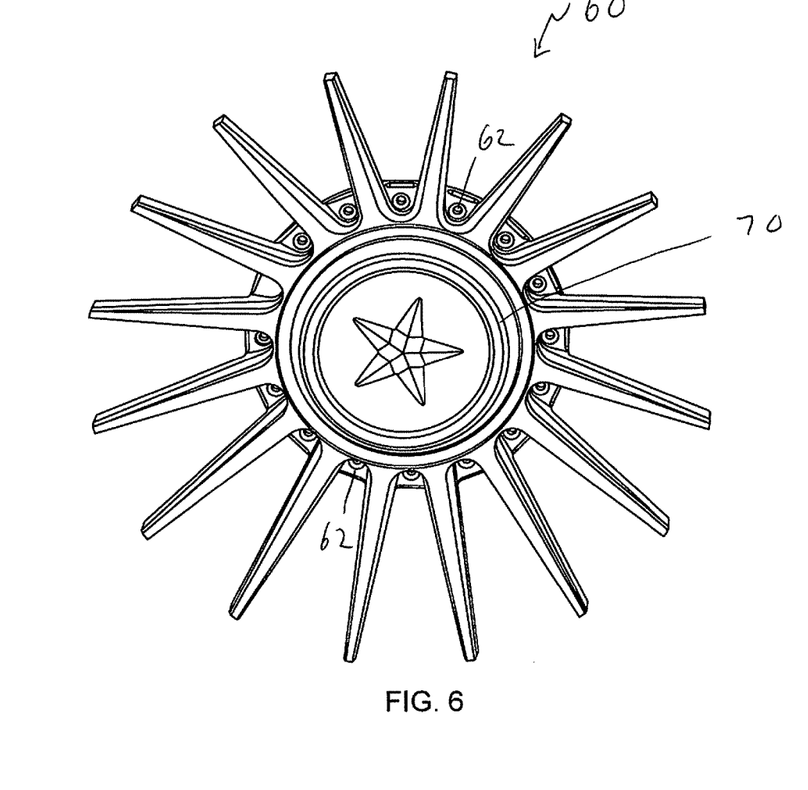
FIG. 6 is a perspective view of one non-limiting decorative member preferably manufactured by the process of FIG. 5.

FIG. 5 illustrates a non-limiting process flow embodiment for manufacturing the decorative member 60 from the blank profile 180 preferably manufactured by the process described above for FIG. 4. The blank profile 180 can be positioned within a CNC milling machine 400, which is used to create the specific decorative and functional design for decorative center member. Preferably, the CNC milling machine can be programmed with all needed information for machining the blank profile 180 into the specific decorative center member 60. As seen in FIG. 6, which shows a non-limiting embodiment of a finished decorative member 60, the decorative member 60 is provided with all holes/apertures 62 needed for securing the decorative member 60 to the base wheel 30, that are aligned with the holes 40 of the base wheel 30 when attaching the decorative member 60 to the base wheel 30. In one non-limiting embodiment, the CNC milling machine can be a 3-axis CNC milling machine. Other machines that allow a specific design to be machined from a blank profile 180 can also be used and are considered within the scope of the disclosure. The holes can be provided on a flat surface produce by the CNC milling machine. In one non-limiting embodiment, the center decorative member 60 can be considered a 3-dimensional design/member/piece that extends outward and upward from a center or central portion 70 of the decorative member 60.

Figures 7, 7A:
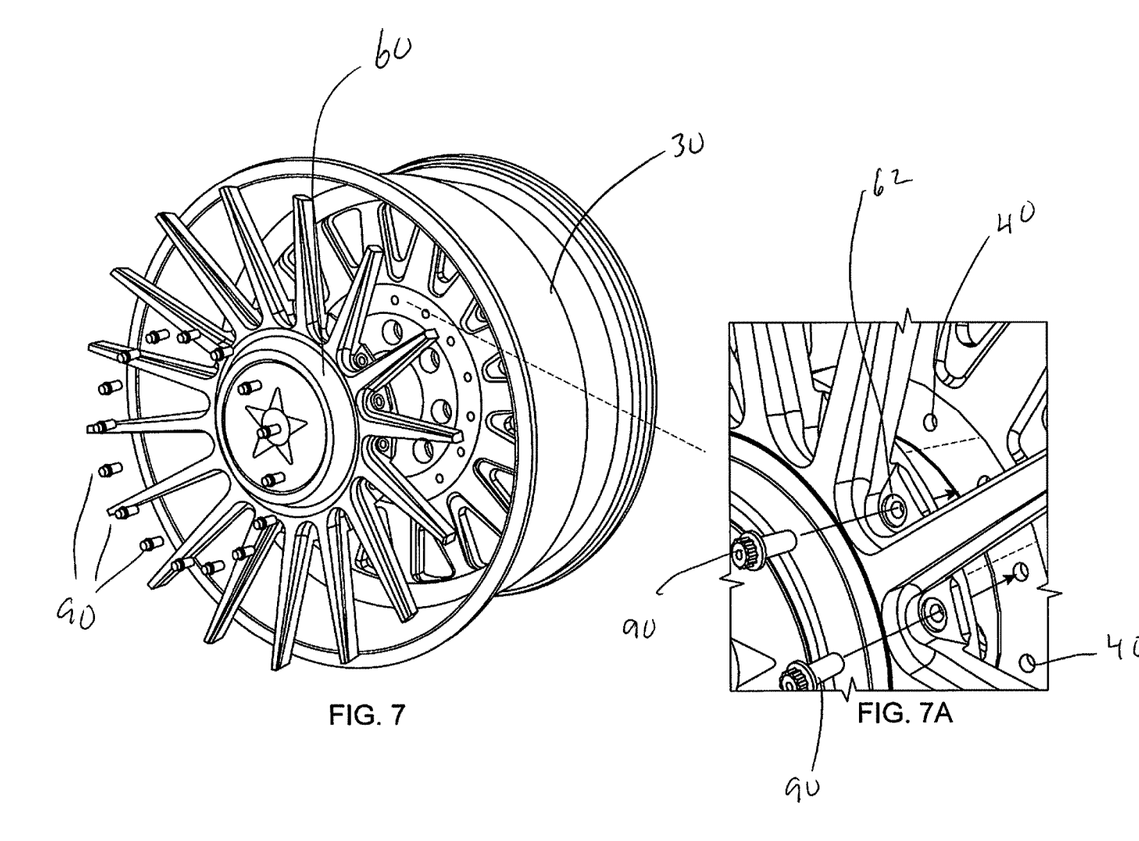
FIG. 7 is a perspective exploded view illustrating how the decorative member is attached to the vehicle base wheel by the plurality of bolts.
FIG. 7a is a close up perspective exploded view of the attaching shown in FIG. 7 in accordance with the present disclosure.
Figure 8:
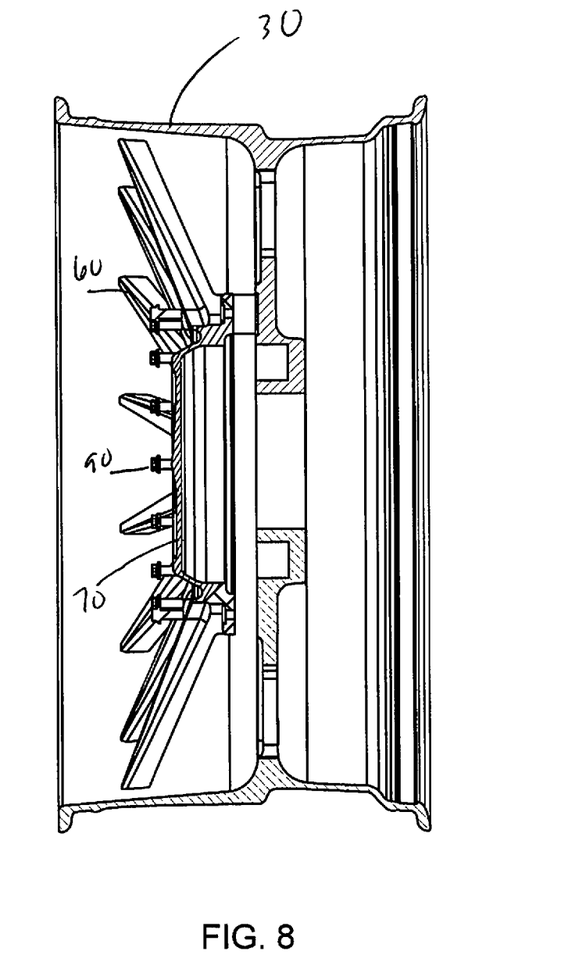
FIG. 8a is a side sectional view of the decorative member attached to the vehicle base wheel in accordance with the present disclosure.
FIG. 8b is a perspective sectional partial view of the decorative member attached to the vehicle base wheel in accordance with the present disclosure.
FIG. 8c is a close up perspective partial view of the decorative member attached to the vehicle base wheel in accordance with the present disclosure.
Figure 8B:
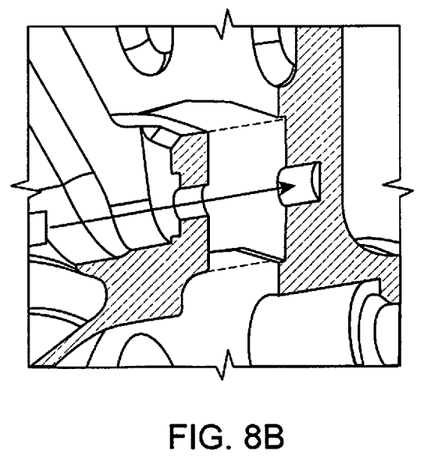
Figure 8C:
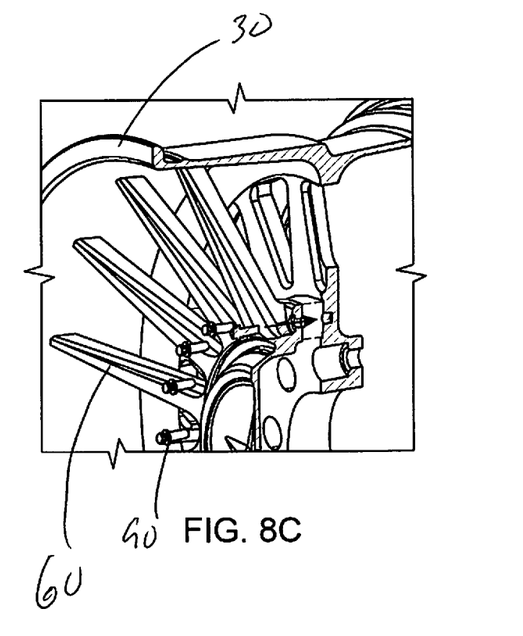

FIG. 7 shows the preferred threaded bolts 90 that are for securing the decorative member/center member 60 to the base wheel 30. Preferably, each mounting aperture 62 for the decorative member 60 is aligned with a correspondence aperture 40 on the base wheel 30. Preferably, these apertures can be threaded. A decorative center portion 70 can also be provided for the decorative member 60 and the design of the center portion, where one is provided, is not considered limited to any particular design, pattern, artwork, text, etc. The center portion design can also be made by the CNC milling machine. FIG. 7a shows that the base wheel 30 can be provided with a groove for receiving the decorative center. FIGS. 8a, 8b and 8c further illustrate the attachment relationship between the base wheel 30 and decorative member 60.

Figure 9A:
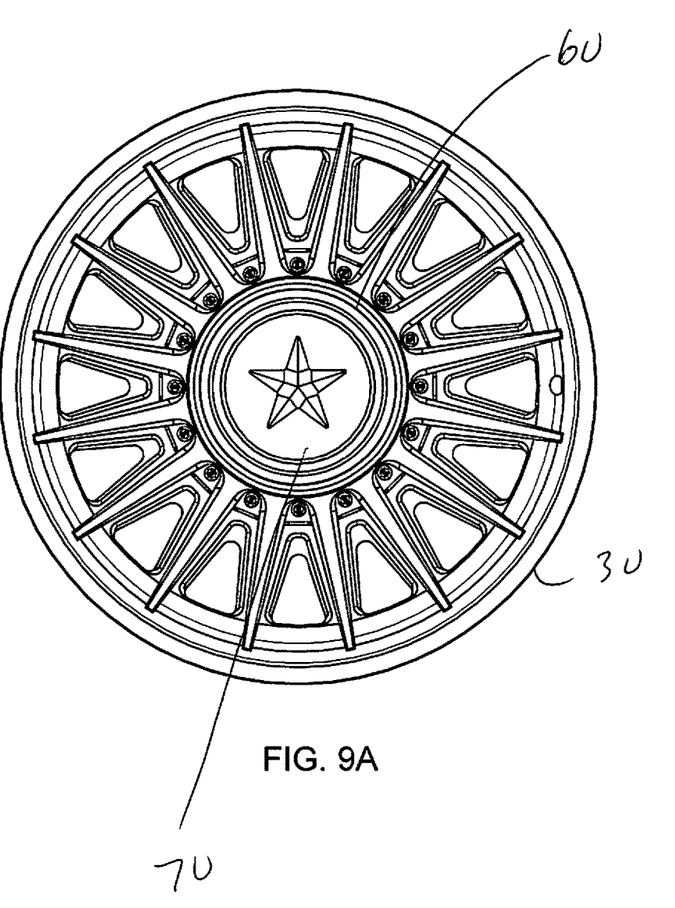
FIG. 9a is a front view of one non-limiting vehicle wheel comprising a base wheel and attachment member in accordance with the present disclosure.
Figure 9B:
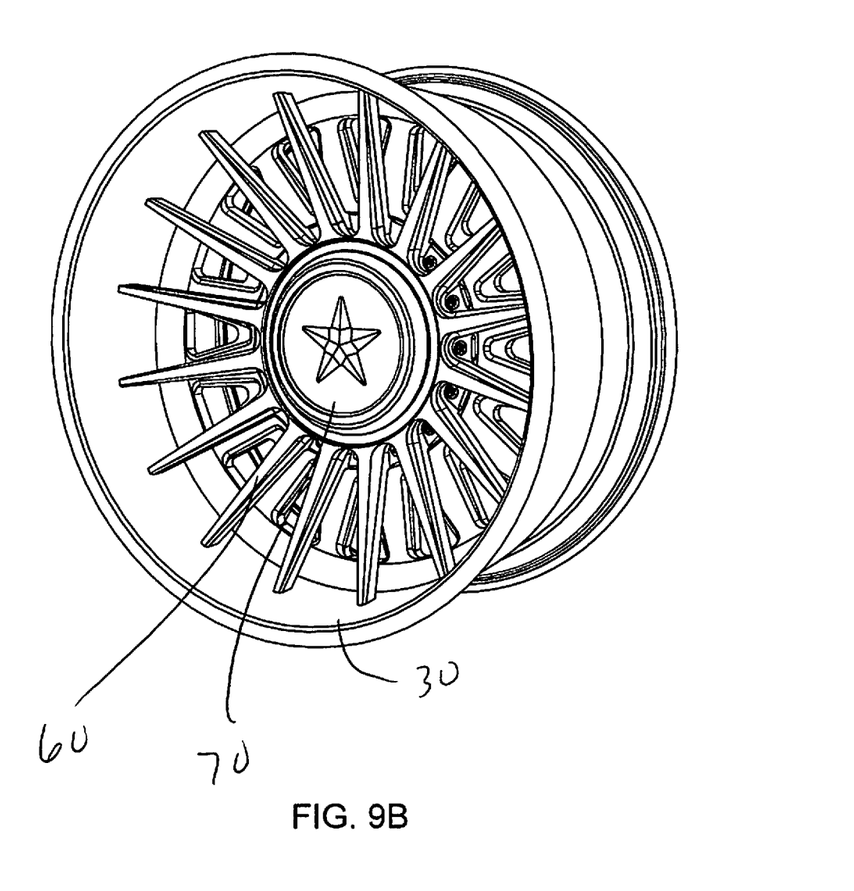

FIGS. 9a and 9b illustrate two view of one non-limiting vehicle wheel design having a base wheel 30 and decorative center member 60 that is produced using the above described process.

Preferably, the base wheel is bolted to the vehicle hub, prior to attaching the decorative center to the base wheel, especially where the center portion of the decorative member covers up the lug bolt holes of the base wheel and thus makes them inaccessible. In other embodiments, the center portion of the decorative member can be removable (i.e. removable cap, etc.) which could provide access to the lug bolt holes of the base wheel, even when the decorative member is secured to the base wheel and thus without having to remove the entire decorative member.

Though not considered limiting, preferably the circular wall of the base wheel defines a receiving area for receiving the decorative member. Though also not considered limiting, preferably the upward and outward extension of the decorative member from its center portion is only to a length or dimension that the decorative member is contained within the receiving and does not extend beyond the outer edge of the base wheel. However, it is also within the scope of the disclosure that the decorative member extends out of the receiving area (i.e. beyond the outer edge of the base wheel).

The apertures/holes for the decorative member, the holes on the base wheel used to secure the decorative member to it and/or the holes for securing the base wheel to the vehicle (i.e. axle, hub, etc.) can be threaded, though such is not considered limiting and it also within the scope of the disclosure that only certain of these sets or groups of holes/apertures be threaded, or that none of the sets/groups of holes/apertures are threaded (i.e. non-threaded bolts or other fastening devices could be used where no threaded holes are used).

The base wheel can be constructed from any material commonly used for constructing vehicle wheels.

Preferably, the holes machined in the preferred center of the decorative member (i.e. 3D center, 3D insert, etc.) correspond to the holes provided on the base wheel to enable fixture between the decorative member and base wheel. Preferably, the number of holes on the decorative member are the same as the number of holes on the base wheel that are used for securing the decorative member. However, it is also within the scope of the disclosure that there are more holes on the base wheel as compared to the number of holes on the decorative member or that there are more holes on the decorative member as compared to the number of holes on the base wheel used for securing the decorative member to the base wheel.

Though not considered limiting, the decorative member can be made from aluminum, and preferably from a block of forged T6061 aerospace grade aluminum, though other materials can also be used and are also considered within the scope of the disclosure.

Preferably, the design chosen for the decorative member is based on, matches or relates to the design chosen for the base wheel.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal number of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the disclosed embodiments have been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A vehicle wheel for a motor vehicle, comprising
a base wheel having a center hub bore and a first plurality of centrally located mounting holes, the base wheel having a second plurality of centrally located securing holes, the second plurality of centrally located securing holes adjacent to the first plurality of centrally located mounting holes, the base wheel adapted for conventional securement to an axle or hub of a motor vehicle; and
a separate body member shaped to form a specific design, the body member removably attached to a center portion of the base wheel, the body member having a plurality of centrally located apertures that are aligned with the second plurality of centrally located securing holes when the separate body member is attached to the base wheel;
wherein the specific design extends upward and outward from a central area of the body member within a perimeter portion of the base wheel and away from a vehicle that the base wheel is adapted for securement to during use.

2. The vehicle wheel of claim 1 further comprising a plurality of bolts, wherein when attaching the body member to the base wheel each aperture of the plurality of centrally located body member apertures is aligned with a corresponding one of the plurality of centrally located securing holes of the base wheel and a bolt from the plurality of bolts is inserted in each of the centrally located and aligned body member aperture/base wheel hole combinations.

3. The vehicle wheel of claim 2 wherein each aperture of the plurality of apertures is a threaded aperture and each bolt of the plurality of bolt is a threaded bolt.

4. The vehicle wheel of claim 1 wherein the base wheel having a plurality of spokes that form a specific design for the base wheel and the plurality of centrally located mounting holes and the plurality of centrally located securing holes are both located at an inner end of the plurality of spokes.

5. The vehicle wheel of claim 1 wherein the body member having a symmetrical shape.

6. The vehicle wheel of claim 1 wherein the base wheel having a circular wall that defines a receiving area and the body member having a three dimensional shape and when the body member is attached to the base wheel the three-dimensional shape extends outward and upward from the central area but within the receiving area defined by the circular wall of the base wheel.

7. A multiple piece vehicle wheel for a motor vehicle, comprising
a base wheel having a center hub bore and a first plurality of centrally located mounting holes, the base wheel having a second plurality of centrally located securing holes, the second plurality of centrally located securing holes adjacent to the first plurality of centrally located mounting holes, the base wheel adapted for conventional securement to an axle or hub of a motor vehicle;
a separate body member shaped to form a specific design that extends upward and outward from a central area of the body member, the body member removably attached to a center portion of the base wheel such that the upward and outward extension is within a perimeter portion of the base wheel and away from a vehicle that the base wheel is adapted for securement to during use, the body member having a plurality of centrally located apertures that are aligned with the second plurality of centrally located securing holes when the separate body member is attached to the base wheel; and
a plurality of bolts, wherein when attaching the body member to the base wheel each aperture of the plurality of centrally located body member apertures is aligned with a corresponding one of the plurality of centrally located securing holes of the base wheel and a bolt from the plurality of bolts is inserted in each of the centrally located and aligned body member aperture/base wheel hole combinations.

8. The multiple piece vehicle wheel of claim 7 wherein each aperture of the plurality of apertures is a threaded aperture and each bolt of the plurality of bolt is a threaded bolt.

9. The multiple piece vehicle wheel of claim 7 wherein the base wheel having a plurality of spokes that form a specific design for the base wheel and the plurality of centrally located mounting holes and the plurality of centrally located securing holes are both located at an inner end of the plurality of spokes.

10. The multiple piece vehicle wheel of claim 7 wherein the body member having a symmetrical shape.

11. The multiple piece vehicle wheel of claim 7 wherein the base wheel having a circular wall that defines a receiving area and the body member having a three-dimensional shape; wherein when the body member is attached to the base wheel the three-dimensional shape extends outward and upward from the central area to a perimeter portion of the base wheel within the receiving area defined by the circular wall of the base wheel.

12. The multiple piece vehicle wheel of claim 7 wherein the base wheel having a groove, wherein when the separate body member is attached to the base wheel a portion of the separate body member is received within the groove of the base wheel.

13. A multiple piece vehicle wheel for a motor vehicle, comprising a base wheel having a center hub bore, a groove and a first plurality of centrally located mounting holes, the base wheel having a second plurality of centrally located securing holes, the second plurality of centrally located securing holes adjacent to the first plurality of centrally located mounting holes, the base wheel having a circular wall that defines a receiving area, the base wheel adapted for conventional securement to an axle or hub of a motor vehicle;

a separate body member shaped to form a specific design that is three-dimensional and symmetrical in shape and which extends upward and outward from a central hub area, the body member removably attached to a center portion of the base wheel, the body member having a plurality of centrally located apertures that are aligned with the second plurality of centrally located securing holes when the separate body member is attached to the base wheel, wherein when the separate body member is attached to the base wheel a portion of the separate body member is received within the groove of the base wheel and the three-dimensional shape extends outward and upward from the central hub area to a perimeter portion of the base wheel but within the receiving area defined by the circular wall of the base wheel;

a plurality of bolts, wherein when attaching the body member to the base wheel each aperture of the plurality of body member apertures is aligned with a corresponding one of the plurality of securing holes of the base wheel and a bolt from the plurality of bolts is inserted in each of the aligned body member aperture/base wheel hole combinations.

14. The multiple piece vehicle wheel of claim 7 wherein each aperture of the plurality of apertures is a threaded aperture and each bolt of the plurality of bolt is a threaded bolt.

15. The multiple piece vehicle wheel of claim 7 wherein the base wheel having a plurality of spokes that form a specific design for the base wheel and the plurality of centrally located mounting holes and the plurality of centrally located securing holes are both located at an inner end of the plurality of spokes.

* * * * *